No. 851,520. PATENTED APR. 23, 1907.
W. McA. JOHNSON.
METALLURGICAL CONDENSER.
APPLICATION FILED JULY 14, 1904.
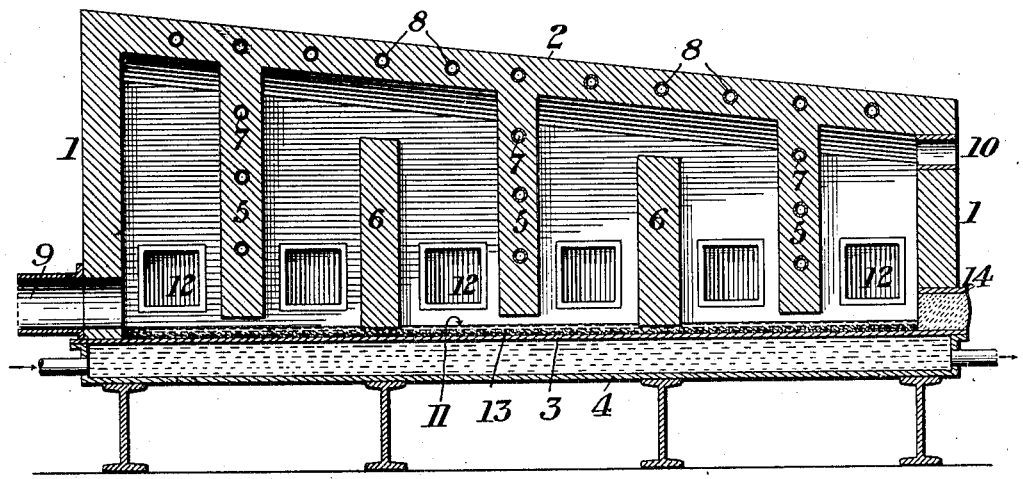
Witnesses
R A Balderson
J. B. Hill
Inventor:
Woolsey McA. Johnson,
by Rymes & Townsend,
Att'ys.

UNITED STATES PATENT OFFICE.

WOOLSEY McA. JOHNSON, OF IOLA, KANSAS.

METALLURGICAL CONDENSER.

No. 851,520.  Specification of Letters Patent.  Patented April 23, 1907.

Application filed July 14, 1904. Serial No. 216,569.

*To all whom it may concern:*

Be it known that I, WOOLSEY McA. JOHNSON, a citizen of the United States, residing at Iola, in the county of Allen and State of Kansas, have invented certain new and useful Improvements in Metallurgical Condensers, of which the following is a specification.

This invention is a metallurgical condenser, particularly designed for the collection of zinc.

My condenser is more especially intended for use in large units and for substantially continuous operation.

In its preferred form my condenser comprises a chamber of suitable dimensions having top and side walls of fire-brick or other refractory material which may be suitably cooled. The bottom of the condenser is a plate of metal, preferably iron, the outer face of which is suitably cooled as by a current of water, air or other cooling medium. The condenser is preferably provided with baffle plates, which may also be cooled. In operation sufficient heat is transferred through the metallic base plate to cause a thin layer of solid metal to collect upon and protect the base plate. Upon this layer of frozen metal is a fluid layer of zinc, upon and above which the zinc fumes are condensed.

For a full understanding of my invention reference is made to the accompanying figure illustrating in vertical longitudinal section one form of my condenser.

Referring to the figure, the condenser is shown as comprising side and end walls 1 and top 2 of fire-brick or other suitable refractory material. The base of the condenser is a metallic plate 3, to the outer surface of which a jacket 4 for the circulation of water or other cooling medium is applied. The condenser is preferably provided with baffle plates 5, 6, conveniently of fire-clay, some or all of which may be provided with cooling pipes, as indicated at 7. I may also cool the top and walls of the condenser, a circulating system for cooling the top being indicated at 8.

The baffle plates are indicated as arranged to provide a tortuous course for the volatile products of the reduction between the inlet 9 and the outlet 10, the depending baffles 5 extending nearly to the surface of the condensed metal 11 and the baffles 6 extending upwardly from a point beneath the surface of the metal but above the base 3. The depending baffle walls 5 may extend to or slightly below the surface of the metal 11, thus forcing the vapors of zinc to pass in contact with or through the condensed metal. Doors 12, 12 are conveniently located to afford access to all parts of the condenser.

In the continuous operation of a large condenser, the temperature tends to rise rapidly, owing to the heat transferred from the furnace by the volatile products and the heat development due to the condensation of the zinc; furthermore, the radiating surface per unit of volume of volatile products passing through the condenser is reduced as the capacity of the condenser is increased. These considerations render it necessary to apply to a large condenser an effective cooling system, a necessity which does not arise with small units. The metallic base plate permits a rapid transfer of heat and is therefore more effective than fire-clay walls, but it is necessary to provide means for protecting the metal of the base plate against the action of the condensed metal. I have found that by cooling the base plate to a sufficient degree to maintain upon it a thin layer of solidified zinc the metal of the plate is perfectly protected and the product may be recovered without contamination. This layer of frozen zinc is indicated at 13. The liquid metal 11 collects upon the solidified layer 13 and is preferably intermittently tapped from the condenser through tap-hole 14.

I claim:

1. A metallurgical condenser having an interior non-metallic surface, a base plate of metal, and means for cooling said base plate, substantially as described.

2. A metallurgical condenser having an interior non-metallic surface, a base plate of metal, means for cooling said base plate, and means for directing the vapors in a tortuous path through said condenser, substantially as described.

3. A metallurgical condenser having an interior non-metallic surface, a base plate of metal, means for cooling said base plate, baffle walls arranged to direct the vapors in a tortuous path through said condenser, and means for cooling some or all of said baffle walls, substantially as described.

In testimony whereof, I affix my signature in presence of two witnesses.

WOOLSEY McA. JOHNSON.

Witnesses:
A. M. EWING,
E. T. EWING.